United States Patent [19]

Lynch et al.

[11] Patent Number: 5,384,148
[45] Date of Patent: Jan. 24, 1995

[54] CARAMEL CONFECTIONS AND PROCESSES FOR PREPARING AND USING

[75] Inventors: William R. Lynch; Larry D. Smith, both of Milford, Del.; Matthew J. Wiant, Aston, Pa.; Robert R. Bianca, Collierville, Tenn.; David Kelley, Jr., Dagsboro, Del.

[73] Assignee: Kraft General Foods, Inc., Northfield, Ill.

[21] Appl. No.: 983,445

[22] Filed: Dec. 1, 1992

[51] Int. Cl.⁶ .......................... A23G 3/00; A23L 1/36
[52] U.S. Cl. .................................. 426/632; 426/660
[58] Field of Search ............................... 426/632, 660

[56] References Cited

U.S. PATENT DOCUMENTS

| | | |
|---|---|---|
| 2,122,016 | 6/1938 | Stokes . |
| 2,524,291 | 10/1950 | Hoffman . |
| 3,677,771 | 7/1972 | Kolar . |
| 4,098,914 | 7/1978 | Knechtel ........................ 426/600 |
| 4,317,839 | 3/1982 | Mitchell et al. ................. 426/600 |
| 4,927,645 | 5/1990 | Lee ................................... 426/93 |

OTHER PUBLICATIONS

Candy Technology, J. J. Alikonis, AVI Publishing Co., 1983, pp. 147–164.

*Primary Examiner*—Robert A. Dawson
*Assistant Examiner*—W. L. Walker
*Attorney, Agent, or Firm*—Thomas R. Savoie; Thomas A. Marcoux

[57] ABSTRACT

Caramel confections which facilitate coating, depositing, molding and baking are prepared from a finely divided solid candy phase dispersed within a continuous fat phase. These products differ from conventional caramel products which are based on sugars and milk protein and typically exhibit a chewy texture but are difficult to mold or to otherwise handle. A powdered caramel brittle material is made by sheeting, cooling and grinding a caramel prepared by cooking aqueous milk solids with sugar to a moisture level of below 6%. Preferably, from 5 to 35% of the powdered caramel brittle is mixed with 30 to 60% granulated sugar, 17 to 40% fat, and 10 to 25% milk solids. The mixture is refined to obtain an average particle size of 0.0004 to 0.0020 inches, mixed with an emulsifying agent and additional vegetable fat, and heated as necessary to reduce the moisture level.

19 Claims, No Drawings

CARAMEL CONFECTIONS AND PROCESSES FOR PREPARING AND USING

TECHNICAL FIELD

The invention relates to caramel confections and particularly to caramel compositions which facilitate coating, depositing, molding and baking.

True caramel products are based on sugars and milk protein and typically exhibit a chewy smooth texture and a characteristic flavor. The texture in terms of graininess and shortness is modified by balancing the relative amounts of sucrose and corn syrup, the level of fat and the degree of working during cooling. However, working within these parameters does not enable management of a basic practical problem. Caramels are difficult to mold such as to form candy bars, deposit for forming chips, use for enrobing candy or baked goods, and use for baking in the form of chips.

The preparation of caramel products having the flavor of traditional caramel, but having improved properties to facilitate their use in a wide range of foods would be a desirable addition to the food producer and the consumer alike.

BACKGROUND ART

The art of preparing caramel candy includes the conventional cooking of sugar, milk, and fat to prepare the various kinds of caramel, including wrapped caramels, plastic cast caramels, cast grained caramels, semi-short chocolate caramels, caramel coating for nougat rolls, summer-type chocolate caramels, and the like as described, for example, by J. J. Alikonis, *CANDY TECHNOLOGY*, AVI Publishing Co., 1983, pages 147, et sec. Caramel candies of these types have not permitted the preparation of all of the various types of caramel-flavored confections as would be desired.

In U.S. Pat. No. 2,122,016, Stokes describes the preparation of a caramel coating by heating a mixture of sugar and milk to caramelize the mixture, followed by mixing in another vessel to "grain" and dry the mixture. This "grained" caramel is then mixed with a small amount of fat until a dough-like mass is formed. This dough-like mass is ground through a refiner and the resulting product is then blended with additional fat to form the coating material.

However, the process described by Stokes has two serious problems which are the probable reasons why this technology has not been commercialized despite the need for a product of this type. First, the "graining" process requires mixers of extreme power to transform the viscous caramel into a dry granular material. Graining in this manner is feasible in the laboratory, but prohibitive on a commercial scale. Secondly, and more importantly, the final compositions prepared in this manner are unstable in their fluid state and quickly separate back into their initial components of fat, and caramel, even when continuously mixed. Immediately after initial mixing, the caramel begins to agglomerate into solid pieces which become permanently separated from the fat phase. Moreover, if the mixing is discontinued, the fat layer completely separates within 15 minutes, and the caramel forms one solid mass. This product cannot be solidified and remelted for later use, cannot be stored, and would be virtually impossible to run in conventional confectionery equipment. The fundamental problem is that the fat and caramel components are basically immiscible when using the Stokes formula and process.

In U.S. Pat. No. 2,524,291, Hoffman describes the preparation of oil-based coatings which can be employed as toppings or casings for ice cream, confectionery and other foods. The process employs water-soluble colors in combination with a water-in-oil emulsifying agent, such as lecithin, to provide coatings with a wide variety of colors, each being uniform in appearance. Among the colors mentioned is a brownish tint, formed by a combination of red, yellow and blue U.S. certified colors, useful for coloring a butterscotch or caramel flavored coating. The flavor compositions for these coatings are not identified. Separation of fat from caramel is not mentioned because real caramel is not employed. This patent describes the general process used in producing many flavored vegetable oil coatings.

In U.S. Pat. No. 3,677,771, Kolar describes the preparation of a caramel-type confectionery product from a reconstitutable condensed milk product. A calcium sequestering agent is employed to avoid the typical loss in texture normally encountered when this type of milk is employed. The texture of the caramels produced is of the character produced by conventional processing and, therefore, not suitable for processing in the ways which we describe.

A number of other variations on the typical caramel texture have been developed for special applications, however, development of specialty products necessarily limits their general usefulness. For example, in U.S. Pat. No. 4,927,645, Lee describes the preparation of a candy coating for snack food. The product is similar to caramel corn. No other significant uses, such as depositing, enrobing, or molding are disclosed.

DISCLOSURE OF THE INVENTION

It is an object of the invention to provide a process for preparing a practically usable and functional caramel confectionery composition.

It is another object of the invention to provide functional caramel confectionery compositions using this new process.

It is yet another object of the invention to provide improved processes for forming caramel confections.

In one of its more specific aspects, it is an object of the invention to provide improved caramel compositions which facilitate coating, depositing, molding and baking.

The method for producing a meltable caramel confectionery material of the invention comprises the steps of: preparing a fluid caramel; cooling it into sheets of caramel brittle; grinding the brittle to a powder; mixing the caramel brittle powder with milk solids, sweetener and fat; refining this mixture and then blending it with emulsifying agent. The resulting blend is stable during subsequent heating to reduce the moisture content as necessary and during subsequent processing.

The fluid caramel material can be prepared by cooking an aqueous mixture of selected ingredients which can include: milk solids (including milk protein), sugar (preferably sucrose, corn syrup and maltodextrin), fat and sufficient initial moisture to assure dissolution of the sugars. The cooking temperature should be sufficient to develop a caramel flavor and reduce the moisture to a level effective for grinding the cooled caramel brittle.

It has been found that mixing the powdered caramel brittle with the milk solids, sugar, and fat prior to refining, aids not only the refining step, but maintains the smooth texture of the final product even after heating and maintaining in liquid form for extended periods of time. The refining step reduces the particle size of the caramel brittle effectively to produce a smooth mouth feel.

According to a preferred method of use, the invention provides a method for enrobing an edible material comprising: (a) preparing a meltable caramel confectionery material according to the above process; (b) heating the confectionery material to a liquid state; (c) applying a coating of the resulting liquefied confectionery material to the edible material; and (d) cooling to solidify the coating.

According to another preferred method of use, the invention provides a method for forming caramel confection pieces comprising: (a) preparing a meltable caramel confectionery material as above; (b) heating the confectionery material to a liquid state; (c) tempering the resulting liquid confectionery material; (d) depositing measured amounts of the resulting liquefied confectionery material onto a support (depositing surface); and (e) cooling to solidify the deposited confectionery pieces. Similarly, the meltable confectionery material can be molded to specific shapes or deposited as a continuous ribbon, sheet or other form which is thereafter cut to desired size.

INDUSTRIAL APPLICABILITY

The invention will be described below with specific reference to a preferred embodiment wherein caramel confections which facilitate coating, depositing, molding and baking are prepared from a finely divided solid candy phase stably dispersed within a continuous fat phase. It will be recognized, though, that the invention has wider applicability. For example, the products of the invention can be utilized in virtually any food product where the flavor of caramel is desired.

The products of the invention differ from conventional caramel products which are also based on sugars and milk protein, but typically exhibit a chewy texture and are difficult to mold and handle. The invention is facilitated by the use of a powdered caramel brittle in a manner that a stable, flowable melt of fat and the powdered brittle is achieved. The powdered caramel brittle is made by first preparing a fluid caramel by cooking aqueous milk solids with sugar to a low moisture level, and cooling to form a caramel brittle and grinding.

The sugar employed in preparing the fluid caramel can be any of those useful in confectionery preparation, but is preferably a mixture of sucrose, corn syrup, and dextrins such as maltodextrin. The sugars can be employed in any suitable form which permits complete dissolution in a caramel cooking kettle or other suitable vessel. The sugars will preferably supply from about 60 to about 75% of the solids in the starting mixture.

The milk can be any of those milk sources known to the art, but is preferably a mixture of condensed skim milk and whey. The milk is preferably unsweetened, but can employ a sweetener if that sweetener is taken into account in the total formulation. The milk is preferably supplied in an amount sufficient to supply from about 5 to about 25% of the weight of solids in the starting mixture. No fat is required in the preparation of the caramel brittle, but may be present to the extent its effect on texture is desired. Preferably, the fat will be kept to a level of less than about 10% of the weight of the starting mixture for preparing the caramel brittle.

The fluid caramel for our caramel brittle is prepared in much the same manner as conventional caramel, except that no additional fat is required and the cooking is continued until the moisture content is reduced to less than about 6.0%, and preferably less than about 4.0%. Preferably, low levels of added fat, e.g. up to 10% are employed. Preferred final moistures are within the range of from about 2% to about 5%, as compared to conventional eating caramels at 10%. The initial moisture content of the mixture should be sufficient (at least about 15%) to assure that all of the sugar or other solids are dissolved by heating. In order to develop the desired flavor and low moisture level, the caramel should be cooked at temperatures from 260° to 330° F. (the lower temperatures can be employed if vacuum is used) until the caramel reaches the hard crack stage. When a sugar syrup such as corn syrup is employed and/or the milk source has a sufficient water content, there may be no need to add water for processing. For optimum flavor, the cooking is preferably conducted in a copper kettle with direct heat application and constant stirring.

Following preparation of the fluid caramel in the kettle, it is preferably removed from the cooking vessel and suitably cooled as discrete pieces such as by forming into sheets of caramel brittle between 3/16 and ¼ inch thick and breaking. The brittle is broken in any type of crusher where the average piece size is reduced for subsequent grinding, usually to less than 2 inches in diameter. The caramel brittle should then be ground in a hammer mill, such as a Fitzpatrick hammer mill, that can reduce the particle size of the caramel brittle fairly uniformly to within the particle size range of from about 0.001 to about 0.06 inches on the average, preferably from about 0.01 to about 0.03 inches.

After grinding and sieving to obtain a suitable particle size distribution, the powdered caramel brittle is combined with milk solids, a dry sweetener or bulking agent, and a suitable fat. Among the dry sweeteners and bulking agents are particulate materials such as sucrose, fructose, dextrose, dextrins, polydextrose and the like, which provide a coating or plating to the individual particles of caramel brittle. These ingredients act as plating agents for the caramel to help insure a homogenous and stable coating after processing. In addition to these ingredients, other minor ingredients such as flavor, color and the like can be incorporated either before or after refining. In general, the level of fat at this-stage in processing will be within the range of from about 5 to about 45%, and dry sweeteners or bulking agents at a level of from about 20 to about 70% the milk solids such as whey are employed at a level of about 10 to 45%, in combination with from about 10 to about 45% of caramel powder, all of these percentages being based on the weight of mixture. More preferred levels are 10 to 35% caramel powder, 17 to 40% fat, 30 to 60% granulated sugar, and 10 to 25% milk solids.

The sweetener employed at this stage (i.e., to transform the powdered caramel brittle into caramel confection) is preferably a sugar such as those identified above, e.g., preferably all sucrose, but can incorporate other sugars as well as nutritional and non-nutritional sweeteners in suitable carriers. Similarly, the milk solids can be from those identified above, but preferably comprise sweet whey powder and nonfat dried milk solids. The fat is preferably one that is solid at room temperature but melts at body temperature. Among the preferred fats are partially hydrogenated oils such as palm kernel, soy bean, canola, corn, cotton seed, coconut, and the like. The SFI profiles below are representative of those for fats with suitable molding and melt properties:

| TEMPERATURE (Degrees F.) | % SOLIDS (Broad) | % SOLIDS (Preferred) |
|---|---|---|
| 50 | 5–80 | 68–74 |
| 70 | 5–70 | 60–66 |
| 80 | 5–55 | 46–52 |
| 92 | 0–25 | 2–6 |
| 100 | 0–5 | 0–1 |

Ideally, the fat is completely premelted, and a portion of the total formula fat is added to a mixer which already contains the full formula amounts of the sugar and milk solids. The amount of fat employed at this stage should be the minimum required to achieve a wet paste (between 16% and 28% fat in mixture). Mixing at this stage will typically take from about 10 to 30 minutes.

Following mixing, the candy mixture is refined, such as in a multi-roll hydraulic refiner of the type used in the preparation of high quality chocolate products. Representative of this type of refiner is a "5-roll Auto-Hopper feed refiner" such as manufactured by Buhler. The material is refined to reduce the particle sizes sufficiently to provide a smooth mouth feel when the confection is eaten, preferably to obtain a final particle size within the range of from about 0.0004 to about 0.0020 inches, and most preferably within the range of from about 0.0007 to about 0.0009 inches. Following refining, the mixture is mixed with the remaining ingredients including the remaining fat (e.g. up to 25% of the refined mixture), an emulsifier such as lecithin, and other optional ingredients such as flavoring and coloring. This mixing is generally done in a conche or secondary mixer under conditions of time and temperature effective to reduce the moisture to less than about 1%. Conching for from about 1 to 10 hours at a temperature of greater than 100° F., e.g., from about 125° to about 135° F., is usually satisfactory.

The caramel confection compositions made in this manner facilitate coating, depositing, molding and baking. A method for enrobing an edible material comprises: preparing a meltable caramel confectionery material according to the above process; heating the confectionery material to a liquid state; applying a coating of the resulting liquefied confectionery material to the edible material; and cooling to solidify the coating.

According to another preferred method of use, the invention provides a method for forming caramel confection pieces comprising: preparing a meltable caramel confectionery material as described above; heating the confectionery material to a liquid state; tempering the resulting liquid confectionery material; depositing measured amounts of the resulting liquefied confectionery material onto a support (depositing surface); and cooling to solidify the deposited confectionery pieces. Similarly, the meltable confectionery material can be molded to specific shapes.

The chips or broken bits of the caramel confection can be employed in preparing baked goods by following the appropriate recipe in the usual manner for preparing baked goods with chocolate chips. Typically, a dough comprising flour, sugar, fat and leavening in reasonable proportions is prepared, the chips are mixed therein and the dough is baked until done.

The following example is presented for the purpose of further illustrating and explaining the invention, and is not to be taken as limiting in any regard. Unless otherwise indicated, all parts and percentages are based on the weight of the components at the stage of processing indicated.

EXAMPLE

A caramel confection is prepared according to the invention by first preparing a powdered caramel brittle from the ingredients listed in Table 1a and then blending that ingredient with those listed in Table 1b, according to the procedure below:

TABLE 1a

| INGREDIENT | PARTS |
|---|---|
| Corn syrup (43DE) (80.5% solids) | 39.1 |
| Sucrose | 36.8 |
| Condensed skim milk (35% solids) | 19.0 |
| Maltodextrin (94% solids) | 11.3 |
| Concentrated whey (45% solids) | 8.7 |
| Partially Hydrogenated Cottonseed oil | 7.2 |
| Vanilla extract | 3.0 |
| Salt | 0.3 |

The above ingredients are blended and heated to 160° to 165° F. The heated mixture is then cooked and concentrated at 280°–285° F. under vacuum until the moisture is reduced to between 3 and 6%. The resulting candy melt is then poured onto a depositing belt and leveled into a 3/16-¼ inch thick sheet which is cooled to a temperature of from 45° to about 100° F. until it becomes brittle. After cooling, the brittle caramel candy is crushed into 2 inch pieces, and ground in a Fitzpatrick hammer mill to form a powder having an average particle size of less than 0.015 inches, with a minimum of 98% of the particles passing through a US #30 screen.

The powdered caramel brittle prepared above, is then blended with the ingredients in the proportions shown in Table 1b, according to the procedure below, to form the caramel confection of the invention.

TABLE 1b

| INGREDIENT | PARTS |
|---|---|
| Sucrose | 44.4 |
| Palm kernel oil (partially hydrog) | 23.6 |
| Caramel Powder | 12.6 |
| Sweet Whey Powder | 12.4 |
| Non-fat dry milk | 5.7 |
| Lecithin | 0.3 |
| Caramel Flavor | 0.9 |
| Brown Color | 0.2 |

The ingredients are preferably added in the order indicated to best achieve mixing. First, the granulated sugar is added to the running mixing vessel. Next, the other dry ingredients including all of the caramel powder and the milk solids are added. Then about 70–80% of the palm kernel oil is added. This pasty mixture is blended for 30 minutes. Finally, remaining minor ingredients including flavors, and colors are added 5 minutes before the completion of the mix.

Following mixing, the composition is refined on a 5-roll hydraulic refiner to achieve an average particle size of from 0.0007 to 0.0009 inches. This refining procedure produces a uniform caramel mixture.

Next, a conche is preloaded with the remaining fat and the lecithin. To this, the refined caramel mixture is added until the conche vessel is loaded with the specified batch weight (e.g., 1000 pounds). The mixture is conched for about 2 hours at about 125° to 135° F., reducing the moisture to about 0.8%. After this moisture is achieved, the flavor and color may be added, and the mixture should be agitated for approximately an additional 20 minutes and pumped to a holding tank. The viscosity of the caramel coating can be adjusted with additional vegetable fat to achieve the desired rheology for any finished application.

The liquid caramel confection produced in this manner can be employed for a number of uses including the production of caramel chips for baking and other uses. For this use, the coating should be standardized to the desired viscosity, and then tempered for several minutes at about 100° F. to achieve stable crystallization before depositing by standard drop forming equipment. The deposited drops can then be cooled and packaged in conventional fashion.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A method for producing a meltable caramel confectionery material comprising the steps of:
   (a) preparing a fluid caramel by cooking an aqueous mixture of milk solids, including milk protein, and sugar, at a temperature above 200° F., the cooking taking place in a cooking vessel in the presence of sufficient initial moisture so that essentially all of the sugars are dissolved, cooking continuing for a time effective to develop a caramel flavor and to reduce the moisture to a level of below 6%;
   (b) removing the fluid caramel from the cooking vessel, forming it into sheets and cooling the sheets to form caramel brittle;
   (c) grinding the caramel brittle to a powder having an average particle size of from about 0.001 to about 0.06 inches;
   (d) mixing from 5 to 35% of the caramel brittle powder with 30 to 60% granulated sugar, 10 to 45% fat, and 10 to 25% milk solids to produce a coarse mixture;
   (e) refining the coarse mixture by passing it through a series of hydraulic refiner rolls to obtain an average particle size of 0.0004 to 0.0020 inches;
   (f) mixing the refined mixture with an emulsifying agent and additional vegetable fat and heating the resulting mixture at a temperature of at least 100° F. with continuous mixing to reduce the moisture level to less than about 1%; and thereafter,
   (g) cooling the mixture.

2. A method according to claim 1 wherein the aqueous mixture of milk solids employed in step (a) comprises whole or skim milk and the sugar comprises corn syrup and sucrose.

3. A method according to claim 1 wherein the moisture in step (a) is reduced to between 3.5 and 6%.

4. A method according to claim 1 wherein the fat in step (d) is employed in an amount of from 17 to 40%.

5. A method according to claim 1 wherein the milk solids referred to in step (d) comprise whey.

6. A method according to claim 1 wherein the refining in step (e) reduces the particle size to an average of 0.0007 to 0.0009 inches.

7. A method according to claim 1 wherein the additional vegetable fat added in step (f) comprises up to 25% of the refined mixture.

8. A method according to claim 1 wherein the heating in step (f) is conducted within the temperature range from 10° to 150° F.

9. A method for producing a meltable caramel composition comprising the steps of:
   (a) preparing a fluid caramel by cooking an aqueous mixture of milk solids, including milk protein, sugar and sufficient initial moisture to assure dissolution of essentially all of the sugar, said cooking being done at a temperature effective to develop a caramel flavor and reduce the moisture content to less than about 6%;
   (b) cooling the fluid caramel to produce a solid caramel brittle;
   (c) grinding the caramel brittle to a powder;
   (d) mixing the powdered caramel at from 10 to 45% by weight with milk solids at 10 to 45% by weight, dry sweetener or bulking agent at 20 to 70% and fat at 5 to 45% by weight;
   (e) refining the mixture of step (d) to reduce particle size sufficiently to provide a smooth mouthfeel when the composition is eaten;
   (f) mixing the refined mixture of step (e) with an emulsifying agent;
   (g) heating the mixture of step (f) with continuous mixing to reduce the moisture content; and then
   (h) cooling the mixture.

10. A method according to claim 9 wherein the grinding in step (c) reduces the particle size to an average of from about 0.001 to 0.06 inches.

11. A method according to claim 9 wherein the refining in step (e) reduces the particle size to an average of 0.0004 to 0.0020 inches.

12. A method according to claim 9 wherein the milk solids employed in step (a) comprises whole or skim milk and the sugar in step (a) comprises corn syrup and sucrose.

13. A method according to claim 9 wherein the fluid caramel is formed into sheets which are then cooled.

14. A method according to claim 9 wherein the refined mixture is mixed with the emulsifying agent and additional fat in step (f).

15. A method according to claim 14 wherein the additional fat added in step (f) comprises up to 25% of the refined mixture.

16. A method according to claim 9 wherein the moisture content is reduced to less than about 1% in step (g).

17. The product produced by the method of claim 9.

18. A method according to claim 9 wherein the meltable caramel composition is heated to a liquid state, then coated onto an edible material and then cooled to solidify the coating.

19. A method according to claim 9 wherein the meltable caramel composition is heated to a liquid state, tempered, deposited onto a support and cooled.

* * * * *